United States Patent
Al Sayeed et al.

(10) Patent No.: US 9,768,902 B2
(45) Date of Patent: Sep. 19, 2017

(54) CONTROL SYSTEMS AND METHODS FOR SPECTRALLY OVERLAPPED FLEXIBLE GRID SPECTRUM USING A CONTROL BANDWIDTH

(71) Applicant: Ciena Corporation, Hanover, MD (US)

(72) Inventors: Choudhury A. Al Sayeed, Gloucester (CA); Edward Chen, Kanata (CA); Paul Chedore, Ottawa (CA); Scott Kohlert, Nepean (CA)

(73) Assignee: Ciena Corporation, Hanover, MD (US)

( * ) Notice: Subject to any disclaimer, the term of this patent is extended or adjusted under 35 U.S.C. 154(b) by 12 days.

(21) Appl. No.: 14/920,120

(22) Filed: Oct. 22, 2015

(65) Prior Publication Data

US 2017/0117983 A1   Apr. 27, 2017

(51) Int. Cl.
*H04B 10/00* (2013.01)
*H04J 14/02* (2006.01)
*H04B 10/079* (2013.01)

(52) U.S. Cl.
CPC .... *H04J 14/0221* (2013.01); *H04B 10/07955* (2013.01); *H04J 14/0201* (2013.01)

(58) Field of Classification Search
CPC .............. H04J 14/0221; H04J 14/0201; H04B 10/07955
See application file for complete search history.

(56) References Cited

U.S. PATENT DOCUMENTS

| | | | |
|---|---|---|---|
| 6,219,162 B1 * | 4/2001 | Barnard | H04J 14/0221 398/9 |
| 6,871,020 B1 * | 3/2005 | Boroditsky | H04B 10/07955 398/38 |
| 7,894,721 B2 * | 2/2011 | Roberts | H04B 10/0793 398/38 |
| 8,095,008 B2 * | 1/2012 | Collings | H04J 14/0205 398/83 |
| 8,280,257 B2 * | 10/2012 | Yang | H04J 14/0206 398/25 |
| 8,509,621 B2 | 8/2013 | Boertjes et al. | |
| 8,971,705 B2 * | 3/2015 | Boertjes | H04B 10/0775 398/197 |
| 9,438,370 B2 * | 9/2016 | Swinkels | H04J 14/0227 |

(Continued)

FOREIGN PATENT DOCUMENTS

WO   2014166207 A1   10/2014

OTHER PUBLICATIONS

"Spectral grids for WDM applications: DWDM frequency grid", International Telecommunication Union, Feb. 2012, pp. 1-16.

*Primary Examiner* — Danny Leung
(74) *Attorney, Agent, or Firm* — Clements Bernard Walker PLLC; Christopher L. Bernard; Lawrence A. Baratta, Jr.

(57) ABSTRACT

Systems and methods to control optical signals in a spectrally overlapped, flexible grid spectrum system include receiving measured power within a control bandwidth for an optical signal, wherein the control bandwidth is less than a spectral occupancy of the optical signal and equal to or greater than a resolution bandwidth of a measurement device configured to measure the measured power; and controlling the optical signal based on the measured power and a target power within the control bandwidth. The optical signals can include Nyquist spaced or super Nyquist spaced signals in a media-channel.

17 Claims, 8 Drawing Sheets

Signal BW – Overlapped BW ≥ Control BW && OCM RBW ≤ Control BW < Signal's Spectral Occupancy

(56) References Cited

U.S. PATENT DOCUMENTS

| | | | | |
|---|---|---|---|---|
| 2004/0081421 | A1* | 4/2004 | Mori | H04B 10/506 385/140 |
| 2014/0112660 | A1* | 4/2014 | Al Sayeed | H04J 14/0221 398/38 |
| 2014/0212133 | A1* | 7/2014 | Kobayashi | H04B 10/07955 398/25 |
| 2014/0328583 | A1* | 11/2014 | Al Sayeed | H04J 14/0289 398/7 |
| 2015/0104181 | A1* | 4/2015 | Mazurczyk | H04B 10/2543 398/115 |

* cited by examiner

*Signal BW − Overlapped BW ≥ Control BW && OCM RBW ≤ Control BW < Signal's Spectral Occupancy*

CONTROL SYSTEMS AND METHODS FOR SPECTRALLY OVERLAPPED FLEXIBLE GRID SPECTRUM USING A CONTROL BANDWIDTH

FIELD OF THE DISCLOSURE

The present disclosure generally relates to optical networking systems and methods. More particularly, the present disclosure relates to control systems and methods in spectrally overlapped flexible grid spectrum using a control bandwidth.

BACKGROUND OF THE DISCLOSURE

In a conventional, fixed grid Dense Wavelength Division Multiplex (DWDM) optical network, optical signals are typically controlled by setting up a target for signal power, and then by measuring the total power of the optical signal, deriving an error between the target and the measured parameter, and then making adjustments to an actuator in single or multiple steps to achieve the target. In the fixed grid spectrum, the optical signals are spaced far apart from each other, or in other words, the grid defined by International Telecommunication Union (ITU) in ITU-T G.694.1 (February 2012), "Spectral grids for WDM applications: DWDM frequency grid," the contents of which are incorporated by reference, is larger than the conventional signal bandwidth (BW) so that the optical signals do not overlap with each other in the spectrum. Hence, the Optical Channel Monitors (OCMs) that are typically used in the Optical Add/Drop Multiplex (OADM) nodes face no problem in measuring and reporting per signal power to the controller to adjust the actuator.

To address the continuous growth and the like, optical networks are evolving to flexible grid DWDM deployments. Note, flexible grid DWDM is now defined and described in ITU Recommendation G.694.1 "Spectral grids for WDM applications: DWDM frequency grid" (February 2012). Specifically, flexible grid DWDM allows a mixed bit rate or mixed modulation format transmission system to allocate frequency slots with different widths so that they can be optimized for the bandwidth requirements of the particular bit rate and modulation scheme of the individual channels. Also, in flexible grid DWDM, optical signals can be spectrally placed close to each other within a media-channel (that is also known as super-channel) in an OADM node to improve spectral efficiency. Disadvantageously, with flexible grid DWDM, the measurement of per signal power becomes difficult due to power contributions from neighboring signals. Specifically, when the optical signals are spectrally squeezed in Nyquist-spacing (center-frequency to center-frequency spacing between signals is equal to or less than each signal's baud rate), even with very high-resolution Optical Spectrum Analyzers (OSAs), it becomes difficult to measure signal powers without knowing each signal's spectral shapes, their overlapping conditions, and without ensuring equal power contributions from all signals within the media-channel.

With the optical channel monitors (OCMs) that are typically used in OADM nodes, which are basically limited resolution OSAs with resolution bandwidths (RBW) of 0.1 nm or more or less, for example, and suffer from aging that translates into spectral drift and inaccuracy, the task of measuring signal power becomes even more difficult. Hence, the conventional way of using a fixed and gridded BW to measure the total signal power, where the signals are guaranteed to be confined within that fixed BW, and not being spectrally overlapped with others, and using that signal power for per signal control does not work and ends up with erroneous results in a spectrally efficient flexible grid super-channel.

In evolving, dynamic optical network, where signal powers need to be adjusted dynamically to compensate for spectral ripple, gain tilt, Wavelength Dependent Losses (WDL), Stimulated Raman Scattering (SRS) or for fiber pinches, a signal controller has to react dynamically as well, and it is not obvious from the conventional controller techniques how that objective can be achieved to control individual signal powers that can equally be applied to signals, when they are closely spaced in the spectrum such as in Nyquist-spacing with different power targets and requirements, as well as, when they are spaced far apart from each other.

BRIEF SUMMARY OF THE DISCLOSURE

In an exemplary embodiment, a method to control optical signals in a spectrally overlapped, flexible grid spectrum system includes receiving measured power within a control bandwidth for an optical signal, wherein the control bandwidth is less than a spectral occupancy of the optical signal and equal to or greater than a resolution bandwidth of a measurement device configured to measure the measured power; and controlling the optical signal based on the measured power and a target power within the control bandwidth. The control bandwidth can be close to a center frequency of the optical signal. The bandwidth can be shifted responsive to a peak power measurement being offset from the center frequency. The measurement device can be a low-resolution Optical Channel Monitor (OCM) at an Optical Add/Drop Multiplex (OADM) node. The optical signals can include one of Nyquist spaced and super Nyquist spaced signals in a media-channel. The spectral occupancy can be greater than the control bandwidth and the control bandwidth is equal to or greater than a resolution bandwidth; and wherein signal bandwidth of the optical signal minus overlapped bandwidth can be greater than or equal to the control bandwidth, such that the measured power is not affected by power contributions associated with neighboring signals. The controlling can include applying new adjustment values to actuators in the control bandwidth based on a control process between the measured power and the target power and applying new adjustment values to actuators outside the control bandwidth based on the control process and a relative bias based on a target spectral shape.

In another exemplary embodiment, an apparatus configured to control optical signals in a spectrally overlapped, flexible grid spectrum system includes a network interface and a processor coupled to one another; and memory storing instructions that, when executed, cause the processor to receive, via the network interface, measured power within a control bandwidth for an optical signal, wherein the control bandwidth is less than a spectral occupancy of the optical signal and equal to or greater than a resolution bandwidth of a measurement device configured to measure the measured power, and cause control of the optical signal based on the measured power and a target power within the control bandwidth. The control bandwidth can be close to a center frequency of the optical signal. The control bandwidth can be shifted responsive to a peak power measurement being offset from the center frequency. The measurement device can be a low-resolution Optical Channel Monitor (OCM) at an Optical Add/Drop Multiplex (OADM) node. The optical signals can include one of Nyquist spaced and super Nyquist spaced signals in a media-channel. The spectral occupancy can be greater than the control bandwidth and the control bandwidth is equal to or greater than a resolution bandwidth; and wherein signal bandwidth of the optical signal minus overlapped bandwidth can be greater than or equal to the control bandwidth, such that the measured power is not affected by power contributions associated with neighboring signals. The control can include application of new adjustment values to actuators in the control bandwidth based on a control process between the measured power and the target power and application of new adjustment values to actuators outside the control bandwidth based on the control process and a relative bias.

In a further exemplary embodiment, an Optical Add/Drop Multiplex (OADM) node in a spectrally overlapped, flexible grid spectrum system includes a multiplexer configured to receive a plurality of optical signals; an Optical Channel Monitor (OCM) configured to measure power of an output of the multiplexer; and a controller configured to receive, via the OCM, measured power within a control bandwidth for an optical signal, wherein the control bandwidth is less than a spectral occupancy of the optical signal and equal to or greater than a resolution bandwidth of the OCM, and cause control of the optical signal, via the multiplexer, based on the measured power and a target power within the control bandwidth. The control bandwidth can be close to a center frequency of the optical signal, and wherein the control bandwidth is shifted responsive to a peak power measurement being offset from the center frequency. The OCM can be a low-resolution Optical Channel Monitor (OCM). The optical signals can include one of Nyquist spaced and super Nyquist spaced signals in a media-channel. The spectral occupancy can be greater than the control bandwidth and the control bandwidth is equal to or greater than a resolution bandwidth; and wherein signal bandwidth of the optical signal minus overlapped bandwidth is greater than or equal to the control bandwidth, such that the measured power can be not affected by power contributions associated with neighboring signals. The control can include application of new adjustment values to actuators in the control bandwidth based on a control process between the measured power and the target power and application of new adjustment values to actuators outside the control bandwidth based on the control process and a relative bias.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
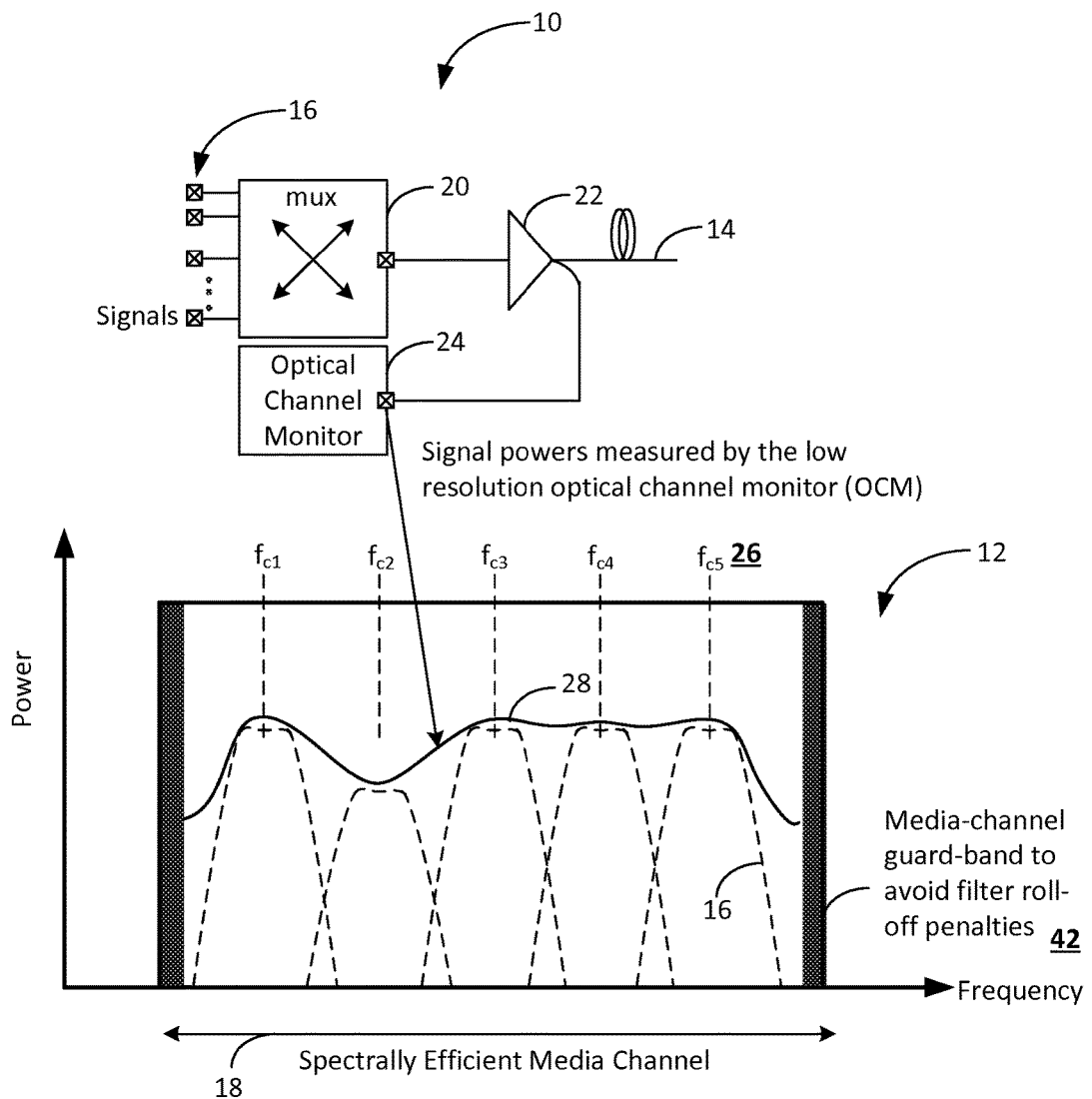
FIG. 1 is a block diagram of an OADM node and associated optical spectrum on a fiber.

In various exemplary embodiments, control systems and methods in spectrally overlapped flexible grid spectrum using a control bandwidth are described. In flexible grid spectrum, wherein the signals are spectrally squeezed in Nyquist-spacing (center-frequency to center-frequency spacing of signals is equal to or less than each signal's baud rate), the systems and methods control the signals, by identifying a control bandwidth (BW) close to a center frequency of each signal where the control BW is less than the spectral occupancy of signal and equal to or greater than the resolution bandwidth (RBW) of the measurement device. The systems and methods set a target power for each signal at a RBW, similar to the control BW, defines an error term by taking the feedback from measuring power at each signal's center frequency at a RBW equal to or smaller than the control BW and then averages that to the control BW, and makes adjustments to a plurality of actuators within the control BW for each signal, and to all other actuators that falls under each signal's occupied spectrum with a relative bias to the attenuation of the controlled BW actuators to achieve the signal's ultimate power or signal-to-noise ratio (SNR) target.

Advantageously, the systems and methods allow controlling signal power in Nyquist-spaced flexible grid spectrum, with existing OCMs and their associated RBW. The systems and methods can control signals in Nyquist-spaced or even in super Nyquist-spaced flexible grid media-channel by defining a small enough control BW close to the center of each signal that provides a handle to the controller to provide reliable control to the signal. The systems and methods also provide effective controls for signals that can have potential notch in the middle of the signal shape by introducing the concept of control frequency offset to shift the control BW from the reference center frequency.

The systems and methods enable control of signals to their individual target power especially when the signals are spectrally placed very close to each other (Nyquist spaced or super-Nyquist spaced). Note that signals placed close to each other may be of different modulation formats, and may need to be launched at different power levels into the fibers. Thus, the systems and methods define a small enough control BW for each signal that is greater than or equal to an OCM RBW at the center or close to the center of the signal, and scale the target and measured powers to that control BW that can provide a relative handle to the controller to move the signal (up or down) towards the target. Note, the control BW is not the signal's effective BW. The control BW can be used to control signal power to a specific target, as well as for SNR measurement and equalization.

Advantageously, the systems and methods remove controller dependency on a signal's spectral shapes. This approach can enable control of alien wavelengths where controllers can handle foreign signals error free for any user initiated mistakes or errors on provisioning signal BWs. The systems and methods can also include a control BW offset concept that can be used to take feedback from any specific portion of the signal that solves control issues for special signal types irrespective of knowing about their detail spectral shapes. Overall, the systems and methods eliminate the complexity of measuring signal power in all type of signal spectral shapes and conditions with minimal or no info from users to provide a reliable handle to the controller to always perform signal control in a robust way.

Referring to FIG. 1, in an exemplary embodiment, a block diagram illustrates an OADM node 10 and associated optical spectrum 12 on a fiber 14. In this exemplary embodiment, the OADM node 10 includes a plurality of signals 16 which form a spectrally efficient media-channel 18 using a multiplexer 20. The multiplexer 20 can include a Wavelength Selective Switch (WSS) or the like with a plurality of actuators to control the signal power of the plurality of signals 16. The OADM node 10 further includes an optical amplifier 22, such as an Erbium Doped Fiber Amplifier (EDFA) or the like, and an Optical Channel Monitor (OCM) 24 configured to receive a tapped portion of the fiber 14, such as with a signal tap. The optical amplifier 22 is configured to amplify the plurality of signals 16 subsequent to the multiplexer 20 and prior to transmission over the fiber 14. The OCM 24 is configured to detect power levels of the plurality of signals 16.

Again, each of the signals 16 is part of the media-channel 18. Each signal 16 has an associated center frequency ($f_{c1}$, $f_{c2}$, $f_{c3}$, $f_{c4}$, $f_{c5}$) 26. There are guard-bands 42 on each side of the media-channel 18 so that signals are not placed on these frequencies to avoid filter roll-off penalties associated with the multiplexer 20. In the optical spectrum 12, the signals 16 are conceptually shown with dotted lines and their center frequencies ($f_{c1}$, $f_{c2}$, $f_{c3}$, $f_{c4}$, $f_{c5}$) 26. However, due to the media-channel 18 spacing, the spectrum 12 sees a composite spectral power or envelope 28. The optical spectrum 12 shows an example of the spectral power or envelope 28 reported by the OCM 24 for Nyquist-spaced signals in the media-channel 18, where each signal's 16 baud-rate is approximately three times higher than the OCM's RBW. Note, the OCM 24 is a limited resolution OCM. As can be seen, even if the signals' spectral shape is defined, due to inconsistent power contribution from neighboring signals, the measurement of per signal total power can be fairly inaccurate that can lead to erroneous control.

Figure 2:
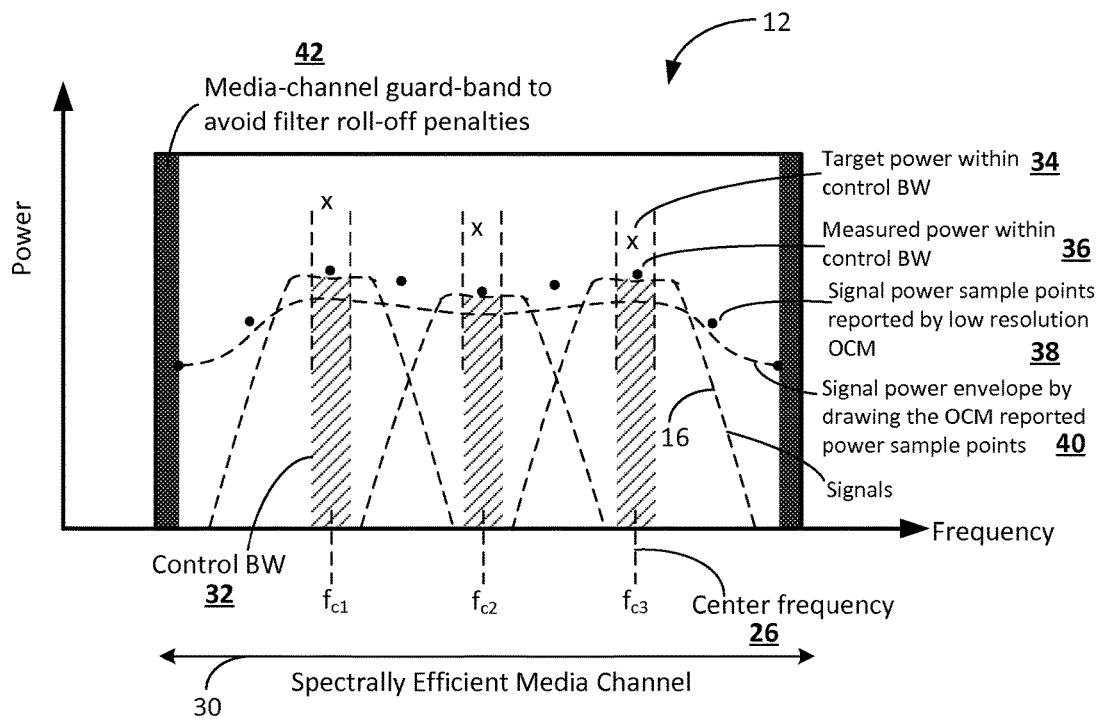
FIG. 2 is a graph of Nyquist-spaced signals within a spectrally efficient media-channel in accordance with the systems and methods.

Referring to FIG. 2, in an exemplary embodiment, a graph illustrates Nyquist-spaced signals within a spectrally efficient media-channel 30 in accordance with the systems and methods. It is assumed that from signals' topology information, each signal's 16 tuned center frequency 26 and its relative spectral occupancy are known in advance. Spectral occupancy defines the minimum BW or channel spacing required to be allocated for the signal 16 in order to run that signal 16 error-free in a spectrally-overlapped flexible grid spectrum.

In the systems and methods, in order to control the signals 16 reliably in the flexible grid spectrum, the dependency on knowing the total signal power is removed. Instead, a control BW 32 is defined for each signal 16 at approximately close to its center frequency 26, where the control BW 32 is less than the spectral occupancy of the signal 16 and equal to or greater than the RBW of the measurement device located at the OADM node 10, e.g., the OCM 24.

A target power 34 is defined for each signal 16 at a resolution bandwidth (RBW) same as the control BW 32. The target power 34 may come from other nodal level controllers or can be defined manually from the perspective of achieving launch Power Spectral Density (PSD) into the fiber 14 or from optimizing Signal to Noise Ratio (SNR) in the line system.

The measurement device such as the OCM 24 is then used to report a measured power 36 for the signal at a RBW equal to or lower than the control BW 32 and then averages to the control BW 32. The OCM 24 can provide signal power sample points 38, and an associated signal power envelope 40 can be determined in the spectrum 12 by connecting the reported signal power sample points 38.

The delta between the target power 34 and the measured power 36 for the control BW 32 defines the error term for a controller similar to any other conventional controllers, for which the controller then derives a proportionate response accordingly. Once the target response is defined, controller applies that response directly to a single or plurality of actuators, such as in the multiplexer 20, that falls under the control BW 32 where all actuators receive the same treatment, and any other actuators that fall under the signal's spectral occupancy but outside the control BW 32 are controlled by a bias relative to the attenuation of the control BW 32 actuators.

Also, the spectrally efficient media-channel 30 can include media-channel guard-bands 42 at either end of the spectrum 12. The guard-bands 42 are used so that signals are not placed on these frequency spaces in order to avoid filter roll-off penalties associated with the multiplexer 20.

In an exemplary embodiment, the OADM node 10 is in a spectrally overlapped, flexible grid spectrum system. Again, the OADM node 10 includes the multiplexer 20 configured to receive a plurality of optical signals 16; the Optical Channel Monitor (OCM) 24 configured to measure power of an output of the multiplexer 20; and a controller 100 configured to receive, via the OCM 24, measured power within a control bandwidth for an optical signal, wherein the control bandwidth is less than a spectral occupancy of the optical signal and equal to or greater than a resolution bandwidth of the OCM 24; and cause control of the optical signal, via the multiplexer, based on the measured power and a target power within the control bandwidth. The control bandwidth can be close to a center frequency of the optical signal, and wherein the control bandwidth is shifted responsive to a peak power measurement being offset from the center frequency. The OCM 24 can be a low-resolution Optical Channel Monitor (OCM). The optical signals can include one of Nyquist spaced and super Nyquist spaced signals in a media-channel. The spectral occupancy is greater than the control bandwidth, and the control bandwidth is equal to or greater than the OCM resolution bandwidth; and wherein signal bandwidth of the optical signal minus overlapped bandwidth is greater than or equal to the control bandwidth, such that the measured power is not affected by power contributions associated with neighboring signals. The control can include application of new adjustment values to actuators in the control bandwidth based on a control process between the measured power and the target power and application of new adjustment values to actuators outside the control bandwidth based on the control process and a relative bias. Also, the control can include new adjustment values to attenuation, laser transmit power adjustments, etc.

Figure 3A:
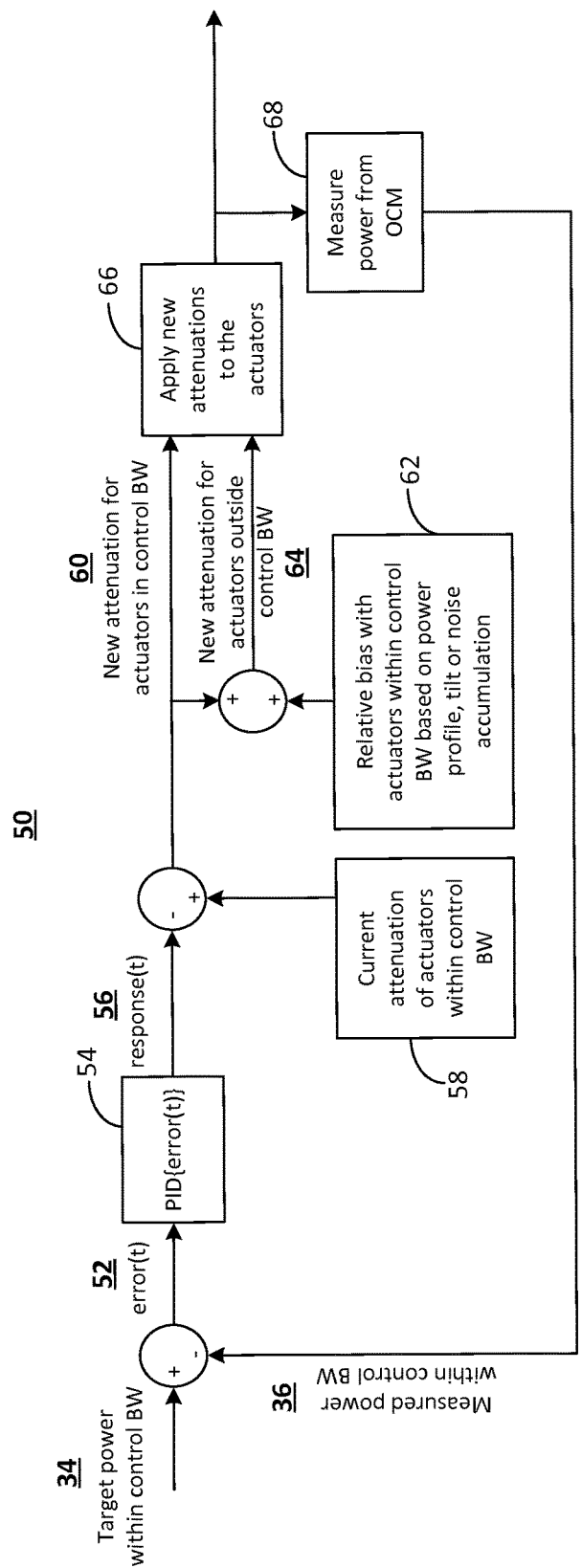
FIG. 3A is a flow diagram of a controller process in accordance with the systems and methods.

Referring to FIG. 3A, in an exemplary embodiment, a flow diagram illustrates a controller process 50 in accordance with the systems and methods. The controller process 50 can be implemented by a controller, such as a controller 100 described in FIG. 7. The controller process 50 generally operates by setting up a target and by measuring power within the given control BW 32 that is primarily decided by the RBW of the OCM 24. The controller process 50 receives the target power 34 within the control BW 32, such from the OCM 24. The target power 34 is combined with the measured power 36 to derive an error(t) 52. For example, the measured power 36 is subtracted from the target power 34.

The error(t) 52 is provided to a Proportional-Integral-Derivative (PID) controller 54 which outputs a response(t) 56. The response(t) 56 is combined with a current attenuation 58 of actuators within the control BW 32 to determine a new attenuation 60 for actuators in the control BW 32. The new attenuation 60 is also combined with a relative bias 62 with actuators within the control BW 32 based on a power profile, tilt, or noise accumulation to determine a new attenuation 64 for actuators outside of the control BW 32.

Note, because the controller process 50 is implemented over the control BW 32, the response(t) 56 is for the actuators in the control BW 32. The actuators outside of the control BW 32 are also controlled based on the relative bias 62. Thus, in an exemplary aspect, the systems and methods propose controlling based on the control BW 32. Again, the control BW 32 is less than the spectral occupancy of the signal 16 and equal to or greater than the RBW of the OCM 24. Thus, the relative bias 62 is used to control the spectral occupancy of the signal 16 outside of the control BW 32. Finally, the new attenuations 60, 64 are applied to the actuators (step 66), the OCMs 24 continues to measure power (step 68) to provide the measured power 36.

Figure 3B:
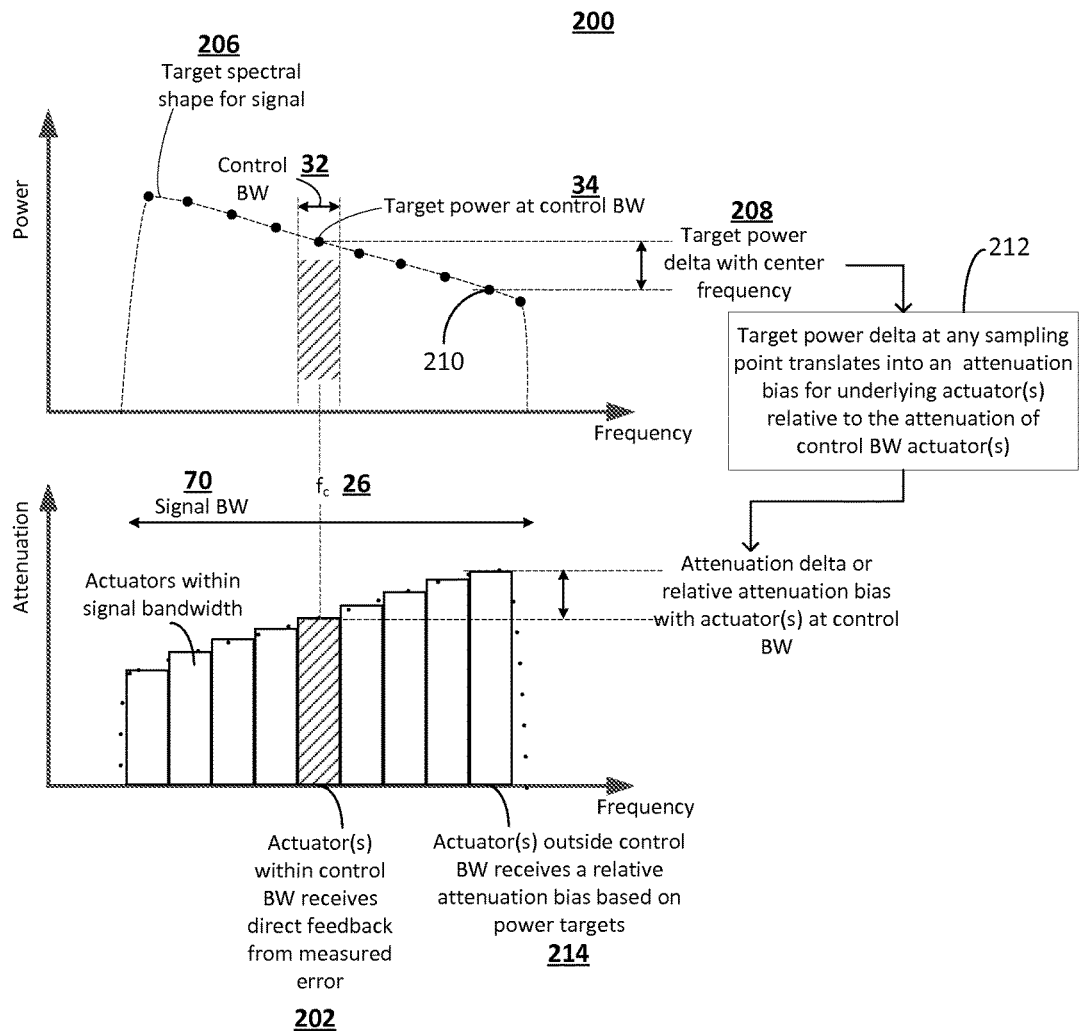
FIG. 3B is graphs of attenuation bias adjustment by a controller or the controller process of FIG. 3A.

Referring to FIG. 3B, in an exemplary embodiment, graphs illustrate attenuation bias adjustment 200 by a controller or the controller process 50. Again, for a specific signal, the controller and the controller process 50 has a target power at the control BW 32 and feedback is received from the measured power to adjust actuators 202 within the control BW 32. If the signal has a target spectral shape 206 that needs to be achieved, then a target power delta 208 between target powers 210 at any sampling point with the target power 34 at the control BW 32 is translated by the controller and the controller process 50 into an attenuation bias relative to the attenuation of the control BW actuators 202 to adjust the attenuation of the underlying actuator(s) (step 212). Further, it is possible to derive attenuation bias targets for any other actuators 214 outside of the control BW 32 either by interpolating or extrapolating power targets from the signal's target spectral shape 206, and in case the target spectral shape is flat, the relative attenuation bias targets will be zero.

In the controller process 50, the actual target power for a signal can be defined in a much larger BW than the control BW 32, and the process 50 includes scaling to an equivalent power target within the control BW 32. For example, for a 50 GHz channel, the target power for the total signal can be 0 dBm. In this case, if the integration BW (or resolution BW) of the control BW is 12.5 GHz, then the process 50 includes scaling the 0 dBm/50 GHz BW channel power target to an equivalent power target in 12.5 GHz. Similarly, for another example, assume target power for the total signal power is 4.5 dBm and the signal BW is 75 GHz and the control BW 32 is 25 GHz and the OPM RBW=12.5 GHz (the point is, control BW does not have to exactly the same as OPM RBW). In this case, the process 50 includes scaling down the target power of the signal to control BW equivalent power target [that will be approximately three times less=−0.27 dBm=4.5−10*$\log_{10}$(75/25))]. All the measured OPM data points are gathered within the control BW 32 can be averaged to determine the power in the control BW 32, and then sent to the controller for control based thereon.

Figure 4:
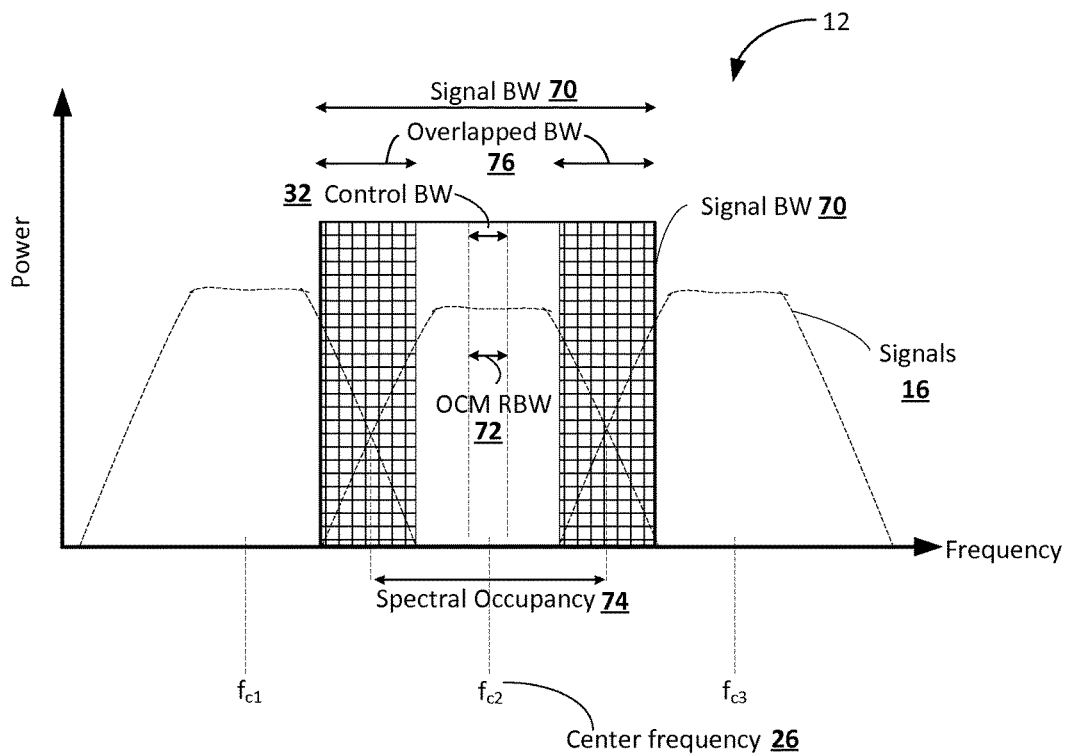
FIG. 4 is a graph of limitations on selecting control bandwidth (BW) in accordance with the systems and methods.

Referring to FIG. 4, in an exemplary embodiment, a graph illustrates limitations on selecting the control BW 32. Again, the control BW 32 is less than signal BW 70 but greater than the OCM's 24 RBW 72. The signals 16 have a specific spectral occupancy 74. Also, portions of the control BW 32 and the signal BW 70 that overlap can be referred to as overlapped BW 76.

The systems and methods can control signals even in super Nyquist-spacing (where the signal to signal center frequency spacing is less than each signal's baud rate) as long as there is a BW or spectral slice available within the signal 16 close to its tuning or center frequency 26, where a reliable power measurement can be taken by the OCM 24 that should not be get affected by the power contributions from the neighboring signals. In other words, the limitation for the proposed controller can be illustrated as:

(Signal BW−Overlapped BW≥Control BW)&&
(OCM RBW≤Control BW<Signal's Spectral Occupancy)

Figure 5:
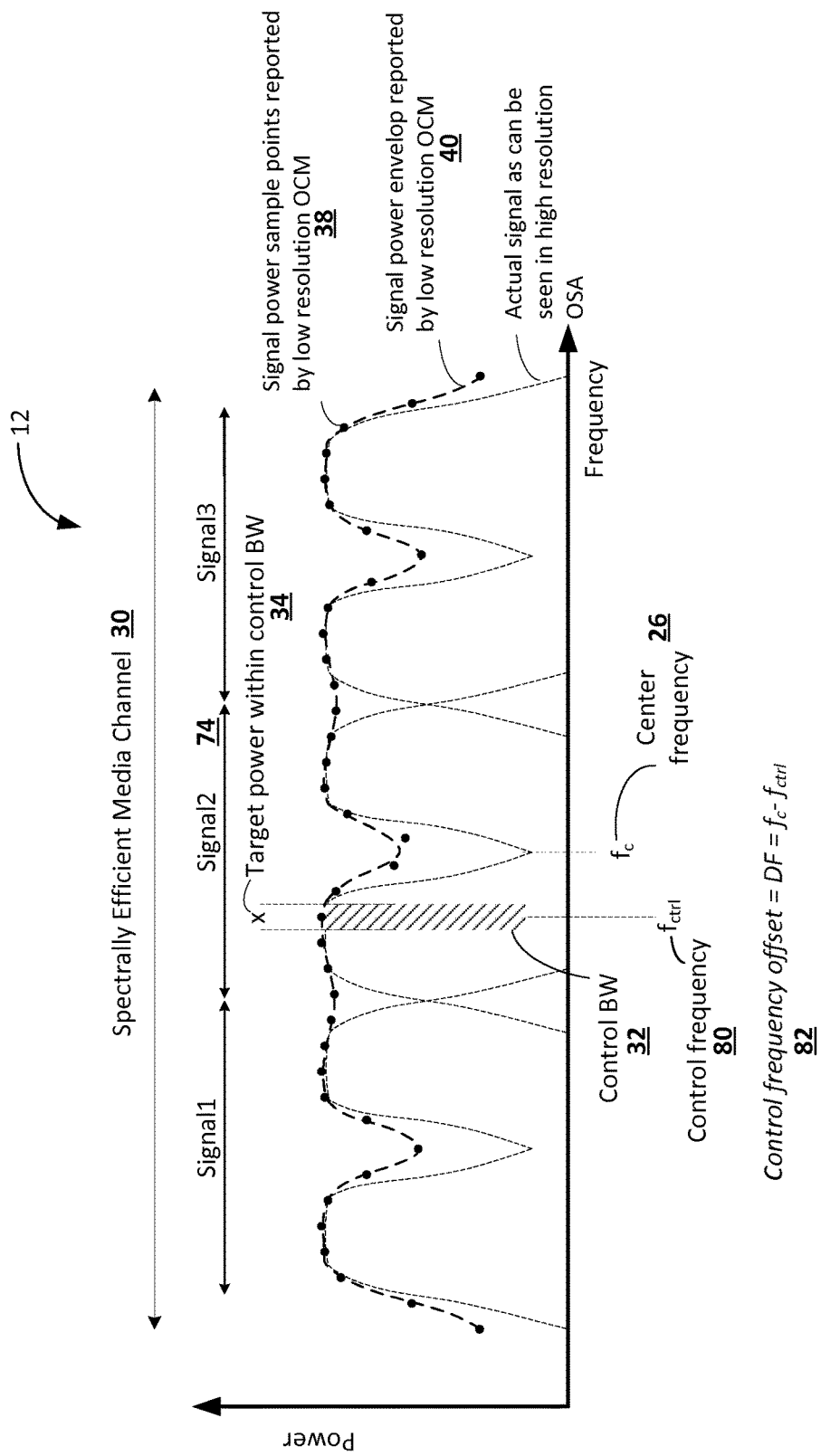
FIG. 5 is a graph of a control frequency offset to shift the control BW in accordance with the systems and methods.

Referring to FIG. 5, in an exemplary embodiment, a graph illustrates a control frequency offset to shift the control BW 32. In FIG. 5, the spectrally efficient media-channel 30 includes three signals, signal 1, signal 2, signal 3. The systems and methods can also be applied for signals whose spectral shape may not be flat at the center or for signals that may have multiple peaks or sub-carriers in it with significant frequency distance in between them that can potentially be visible in the OCM 24. In order to control such signals, a control frequency 80 can be used with a concept of +/− control frequency offset 82 applied to offset intentionally the control BW 32 from the default center frequency 26 of the signal to a point where a valid and reliable data measurement can be obtained.

It would certainly be possible to adapt the controller to search if the measured power sample points 38 are not peak at the center frequency 26 for a given signal 16 within its defined spectral occupancy BW 74, and if the peak measured power and the measured center frequency power differs by a certain threshold, the controller and the controller process 50 can automatically decide to shift its control BW 32 from the center frequency slice towards the frequency slice where the peak power is measured. In order to avoid instability in the controller and the controller process 50, it would be possible to allow the controller to set the control frequency offset only once for a given signal type before initiating the controller actions and not to change in between controller iterations until it converges to the target.

Figure 6:
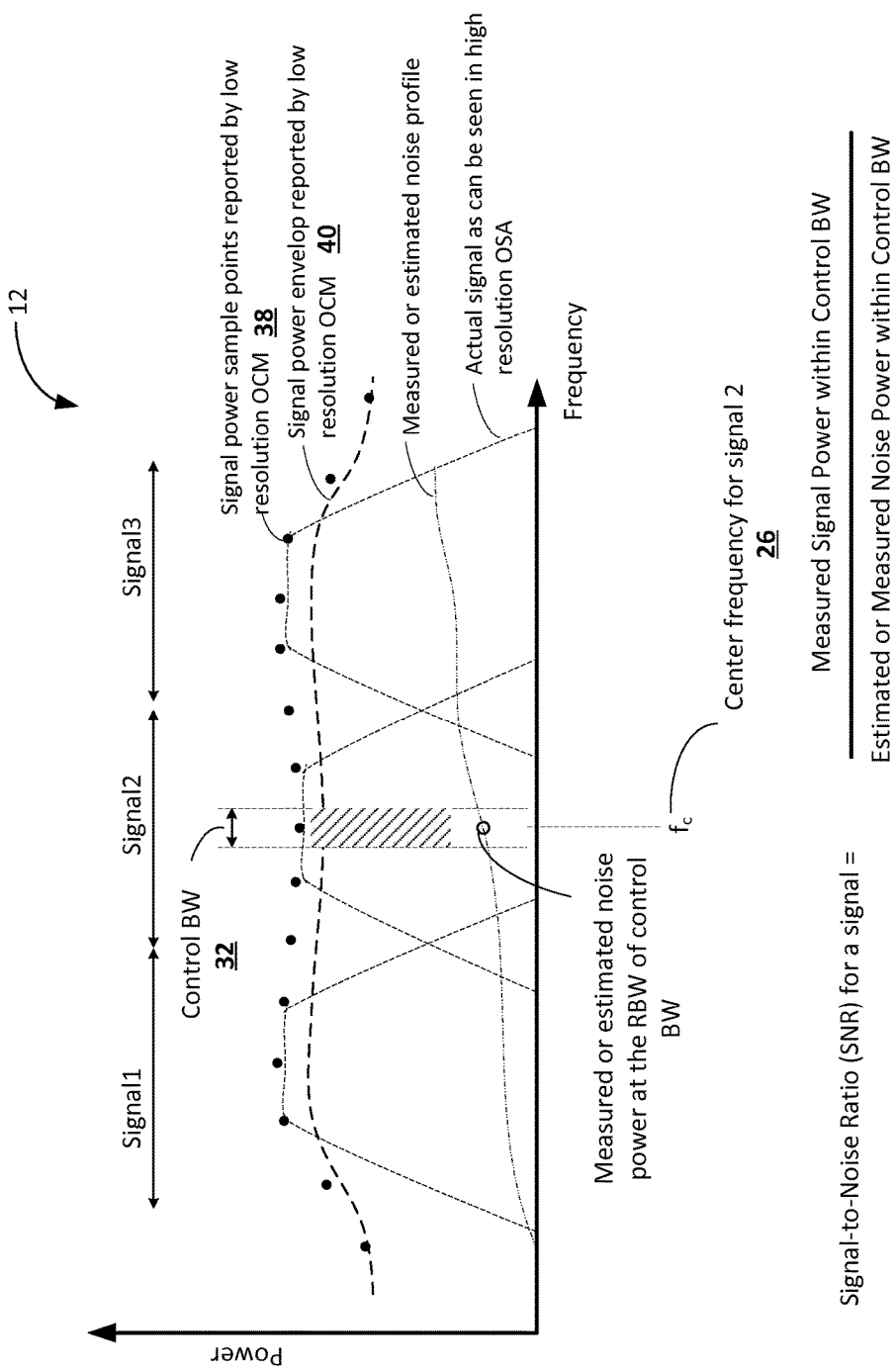
FIG. 6 is a graph of using the control BW concept for Signal to Noise Ratio (SNR) measurements in accordance with the systems and methods.

Referring to FIG. 6, in an exemplary embodiment, a graph illustrates using the control BW 32 concept for SNR measurements. Although the systems and methods are described for measuring and controlling signal power using a specified control BW 32, the systems and methods can also be extended to controlling the signal-to-noise-ratio (SNR) of the signal of interest in a closely-overlapped flexible grid media channel by measuring power within the control BW 32 and then taking the ratio of the noise power within the same BW. This is illustrated for a 3× signal example in FIG. 6. The noise power can either be estimated via modeling the fiber and photonic equipment and their non-linear characteristics in case of an in-service spectrum, or can be measured using conventional methodologies such as plucking signal on/off in an out-of-service exercise. However, the concept is an absolute or relative SNR target at the control BW 32 should drive a new signal power target that should drive controller iterations to achieve the new target.

Figure 7:
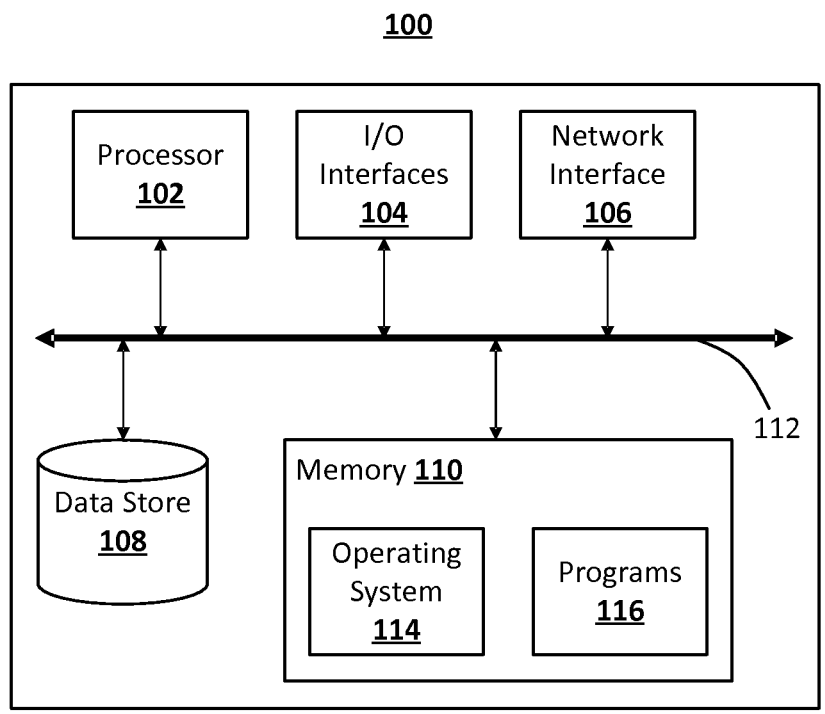
FIG. 7 is a block diagram of an exemplary implementation of a controller that can implement the controller process of FIG. 3A in accordance with the systems and methods.

Referring to FIG. 7, in an exemplary embodiment, a block diagram illustrates an exemplary implementation of a controller 100 that can implement the controller process 50. The controller 100 can be a digital processing device that, in terms of hardware architecture and functionality, generally includes a processor 102, input/output (I/O) interfaces 104, a network interface 106, a data store 108, and memory 110. It should be appreciated by those of ordinary skill in the art that FIG. 7 depicts the controller 100 in an oversimplified manner, and a practical embodiment may include additional components and suitably configured processing logic to support known or conventional operating features that are not described in detail herein. The components (102, 104, 106, 108, and 110) are communicatively coupled via a local interface 112. The local interface 112 can be, for example, but not limited to, one or more buses or other wired or wireless connections, as is known in the art. The local interface 112 can have additional elements, which are omitted for simplicity, such as controllers, buffers (caches), drivers, repeaters, and receivers, among many others, to enable communications. Further, the local interface 112 can include address, control, and/or data connections to enable appropriate communications among the aforementioned components.

The processor 102 is a hardware device for executing software instructions. The processor 102 can be any custom made or commercially available processor, a central processing unit (CPU), an auxiliary processor among several processors associated with the controller 100, a semiconductor-based microprocessor (in the form of a microchip or chip set), or generally any device for executing software instructions. When the controller 100 is in operation, the processor 102 is configured to execute software stored within the memory 110, to communicate data to and from the memory 110, and to generally control operations of the controller 100 pursuant to the software instructions. The I/O interfaces 104 can be used to receive user input from and/or for providing system output to one or more devices or components. The network interface 106 can be used to enable the controller 100 to communicate on a network. For example, the I/O interfaces 104 and/or the network interface 106 can communicatively couple the controller 100 to the OADM 10.

The data store 108 can be used to store data. The data store 108 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 can incorporate electronic, magnetic, optical, and/or other types of storage media. The memory 110 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 110 can incorporate electronic, magnetic, optical, and/or other types of storage media. Note that the memory 110 can have a distributed architecture, where various components are situated remotely from one another, but can be accessed by the processor 102. The software in memory 110 can include one or more software programs, each of which includes an ordered listing of executable instructions for implementing logical functions. The software in the memory 110 includes a suitable operating system (O/S) 114 and one or more programs 116. The operating system 114 essentially controls the execution of other computer programs, such as the one or more programs 116, and provides scheduling, input-output control, file and data management, memory management, and communication control and related services. The one or more programs 116 may be configured to implement the various processes, algorithms, methods, techniques, etc. described herein.

In an exemplary embodiment, the controller 100 can be an apparatus configured to control optical signals in a spectrally overlapped, flexible grid spectrum system. The apparatus includes the network interface 106 and the processor 102 coupled to one another; and the memory 110 storing instructions that, when executed, cause the processor 102 to receive, via the network interface, measured power within a control bandwidth for an optical signal, wherein the control bandwidth is less than a spectral occupancy of the optical signal and equal to or greater than a resolution bandwidth of a measurement device configured to measure the measured power; and cause control of the optical signal based on the measured power and a target power within the control bandwidth. The control bandwidth can be close to a center frequency of the optical signal. The control bandwidth can be shifted responsive to a peak power measurement being offset from the center frequency. The measurement device can be a low-resolution Optical Channel Monitor (OCM) at an Optical Add/Drop Multiplex (OADM) node. The optical signals can include one of Nyquist spaced and super Nyquist spaced signals in a media-channel. The spectral occupancy is greater than the control bandwidth and the control bandwidth is equal to or greater than a resolution bandwidth; and wherein signal bandwidth of the optical signal minus overlapped bandwidth is greater than or equal to the control bandwidth, wherein the overlapped bandwidth is the control bandwidth which overlaps with the signal bandwidth, such that the measured power is not affected by power contributions associated with neighboring signals. The control can include application of new attenuation values to actuators in the control bandwidth based on a control process between the measured power and the target power and application of new attenuation values to actuators outside the control bandwidth based on the control process and a relative bias.

Additionally, it will be appreciated that some exemplary embodiments described herein, such as the controller process 50, the controller 100, may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, the controller 100, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method to control optical signals in a spectrally overlapped, flexible grid spectrum system, the method comprising:
receiving measured power within a control bandwidth for an optical signal, wherein the control bandwidth is less than a spectral occupancy of the optical signal and equal to or greater than a resolution bandwidth of a measurement device configured to measure the measured power, and wherein signal bandwidth of the optical signal minus overlapped bandwidth is greater than or equal to the control bandwidth, such that the measured power is not affected by power contributions associated with neighboring signals; and
controlling the optical signal based on the measured power and a target power within the control bandwidth.

2. The method of claim 1, wherein the control bandwidth is close to a center frequency of the optical signal.

3. The method of claim 2, wherein the control bandwidth is shifted responsive to a peak power measurement being offset from the center frequency.

4. The method of claim 1, wherein the measurement device is a low-resolution Optical Channel Monitor (OCM) at an Optical Add/Drop Multiplex (OADM) node.

5. The method of claim 1, wherein the optical signals comprise one of Nyquist spaced and super Nyquist spaced signals in a media-channel.

6. The method of claim 1, wherein the controlling comprises applying new adjustment values to actuators in the control bandwidth based on a control process between the measured power and the target power and applying new adjustment values to actuators outside the control bandwidth based on the control process and a relative bias based on a target spectral shape.

7. An apparatus configured to control optical signals in a spectrally overlapped, flexible grid spectrum system, the apparatus comprising:
a network interface and a processor coupled to one another; and
memory storing instructions that, when executed, cause the processor to
receive, via the network interface, measured power within a control bandwidth for an optical signal, wherein the control bandwidth is less than a spectral occupancy of the optical signal and equal to or greater than a resolution bandwidth of a measurement device configured to measure the measured power, wherein signal bandwidth of the optical signal minus overlapped bandwidth is greater than or equal to the control bandwidth, such that the measured power is not affected by power contributions associated with neighboring signals, and
cause control of the optical signal based on the measured power and a target power within the control bandwidth.

8. The apparatus of claim 7, wherein the control bandwidth is close to a center frequency of the optical signal.

9. The apparatus of claim 8, wherein the control bandwidth is shifted responsive to a peak power measurement being offset from the center frequency.

10. The apparatus of claim 7, wherein the measurement device is a low-resolution Optical Channel Monitor (OCM) at an Optical Add/Drop Multiplex (OADM) node.

11. The apparatus of claim 7, wherein the optical signals comprise one of Nyquist spaced and super Nyquist spaced signals in a media-channel.

12. The apparatus of claim 7, wherein the control comprises application of new adjustment values to actuators in the control bandwidth based on a control process between the measured power and the target power and application of new adjustment values to actuators outside the control bandwidth based on the control process and a relative bias.

13. A method to control optical signals in a spectrally overlapped, flexible grid spectrum system, the method comprising:
receiving measured power within a control bandwidth for an optical signal, wherein the control bandwidth is less than a spectral occupancy of the optical signal and equal to or greater than a resolution bandwidth of a measurement device configured to measure the measured power, wherein the control bandwidth is close to a center frequency of the optical signal, and wherein the control bandwidth is shifted responsive to a peak power measurement being offset from the center frequency; and
controlling the optical signal based on the measured power and a target power within the control bandwidth.

14. The method of claim 13, wherein the measurement device is a low-resolution Optical Channel Monitor (OCM) at an Optical Add/Drop Multiplex (OADM) node.

15. The method of claim 13, wherein the optical signals comprise one of Nyquist spaced and super Nyquist spaced signals in a media-channel.

16. The method of claim 13, wherein the spectral occupancy is greater than the control bandwidth and the control bandwidth is equal to or greater than a resolution bandwidth; and
wherein signal bandwidth of the optical signal minus overlapped bandwidth is greater than or equal to the control bandwidth, such that the measured power is not affected by power contributions associated with neighboring signals.

17. The method of claim 13, wherein the controlling comprises applying new adjustment values to actuators in the control bandwidth based on a control process between the measured power and the target power and applying new adjustment values to actuators outside the control bandwidth based on the control process and a relative bias based on a target spectral shape.

* * * * *